United States Patent
Chung et al.

(10) Patent No.: US 7,784,073 B2
(45) Date of Patent: Aug. 24, 2010

(54) INFORMATION STORAGE MEDIUM INCLUDING DEVICE-ASPECT-RATIO INFORMATION, METHOD AND APPARATUS THEREFOR

(75) Inventors: Hyun-kwon Chung, Seoul (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2077 days.

(21) Appl. No.: 10/685,701

(22) Filed: Oct. 16, 2003

(65) Prior Publication Data

US 2004/0143793 A1    Jul. 22, 2004

(30) Foreign Application Priority Data

| Oct. 17, 2002 | (KR) | 10-2002-0063632 |
| Nov. 11, 2002 | (KR) | 10-2002-0069592 |
| Aug. 29, 2003 | (KR) | 10-2003-0060246 |
| Aug. 30, 2003 | (KR) | 10-2003-0060546 |
| Aug. 30, 2003 | (KR) | 10-2003-0060547 |

(51) Int. Cl.
G06F 13/00 (2006.01)
G06F 17/21 (2006.01)
H04N 5/46 (2006.01)

(52) U.S. Cl. ............ 725/37; 348/556; 348/558; 715/202; 715/204

(58) Field of Classification Search ............ 725/37
See application file for complete search history.

(56) References Cited

U.S. PATENT DOCUMENTS

| 5,897,644 | A | * | 4/1999 | Nielsen ............ 715/513 |
| 5,907,659 | A | * | 5/1999 | Yamauchi et al. ............ 386/95 |
| 5,982,445 | A | | 11/1999 | Eyer et al. |
| 6,141,693 | A | * | 10/2000 | Perlman et al. ............ 709/236 |
| 6,195,692 | B1 | * | 2/2001 | Hsu ............ 725/110 |
| 6,263,344 | B1 | * | 7/2001 | Wu et al. ............ 707/104.1 |
| 6,681,395 | B1 | * | 1/2004 | Nishi ............ 725/45 |
| 6,973,619 | B1 | * | 12/2005 | Hirose et al. ............ 715/234 |
| 7,080,118 | B2 | | 7/2006 | Hildebrand |
| 7,162,697 | B2 | * | 1/2007 | Markel ............ 715/717 |
| 7,346,920 | B2 | * | 3/2008 | Lamkin et al. ............ 725/112 |
| 2002/0078144 | A1 | | 6/2002 | Lamkin et al. |
| 2002/0106191 | A1 | * | 8/2002 | Betz et al. ............ 386/70 |
| 2002/0126142 | A1 | * | 9/2002 | Hodgkinson ............ 345/719 |
| 2003/0023674 | A1 | | 1/2003 | Hildebrand |
| 2003/0093816 | A1 | | 5/2003 | Chung et al. |
| 2003/0194207 | A1 | | 10/2003 | Chung et al. |

FOREIGN PATENT DOCUMENTS

EP    0 838 948    4/1998

(Continued)

OTHER PUBLICATIONS

U.S. Appl. No. 10/685,702, filed Oct. 16, 2003, Hyun-Kwon Chung et al.

(Continued)

*Primary Examiner*—Andrew Y Koenig
*Assistant Examiner*—Jason Thomas
(74) *Attorney, Agent, or Firm*—NSIP Law (57) ABSTRACT

An information storage medium includes video data and a markup document to play back the video data in an interactive mode. The markup document includes device-aspect-ratio information which is referred to for displaying of the markup document.

7 Claims, 9 Drawing Sheets

FOREIGN PATENT DOCUMENTS

| | | |
|---|---|---|
| EP | 1 307 046 | 5/2003 |
| JP | 10-116065 | 5/1998 |
| JP | 2002-82660 | 3/2002 |
| JP | 2002-207697 | 7/2002 |
| WO | WO 03/036460 | 5/2003 |

OTHER PUBLICATIONS

U.S. Appl. No. 10/685,708, filed Oct. 16, 2003, Hyun-Kwon Chung et al.

Search Report issued in European Patent Application No. 03751556.6 on Aug. 11, 2006.

Korean Patent Abstract, Publication No. 10 20030035757, May 8, 2003.

Patent Abstracts of Japan, Publication No. 10-108143, Apr. 24, 1998.

Substantive Examination Adverse Report issued by the Intellectual Property Corporation of Malaysia on Jun. 19, 2009.

* cited by examiner

INFORMATION STORAGE MEDIUM INCLUDING DEVICE-ASPECT-RATIO INFORMATION, METHOD AND APPARATUS THEREFOR

CROSS-REFERENCE TO RELATED APPLICATION

This application claims the benefit of Korean Patent Application Nos. 2002-63632, 2002-69592, and 2003-60246, filed on Oct. 17, 2002, Nov. 11, 2002, and Aug. 29, 2003, respectively, in the Korean Intellectual Property Office, the disclosures of which are incorporated herein by reference.

BACKGROUND OF THE INVENTION

1. Field of the Invention

The present invention relates to an information storage medium including device-aspect-ratio information of a markup document, and a method and apparatus to play back audio and video (AV) data in an interactive mode using the markup document.

2. Description of the Related Art

Generally, markup documents are written in a markup language such as a hypertext markup language (HTML) or the like. The markup documents may be recorded on or played back from, for example, digital versatile discs (DVDs) via a personal computer (PC). Such DVDs are being sold in the market. Among these DVDs, an interactive DVD supports an interactive mode to show markup-document-based AV contents. Typically, contents recorded on the interactive DVD can be played back in two modes. One of the two modes is a video mode in which contents are displayed as from that of a general DVD. The other mode is an interactive mode in which contents are displayed via a display window defined by a markup document. For example, where a user selects an interactive mode, a web browser in a PC displays a markup document recorded on an interactive DVD, and a display window defined by the markup document displays the contents selected by the user. In other words, an AV picture is obtained from AV data and a markup picture is obtained from a markup document. The AV picture may be embedded in the markup picture to display an interactive picture in an interactive mode.

For example, where contents correspond to an AV data-made movie, the AV data-made movie may be shown in an AV picture, and various types of additional information such as scripts, stories, photos of actresses or actors, or the like may be displayed in a markup picture. The additional information may include a variety of resource files such as image files, text files, animation files, and the like.

Figure 1A:
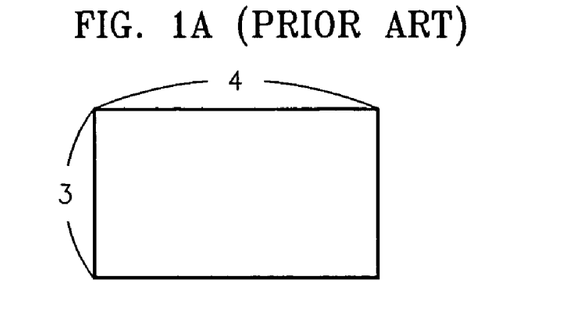
FIGS. 1A, 1B, 1C, and 1D are views showing types of pictures displayed on a display device during a playback from a conventional interactive DVD.
Figure 1B:
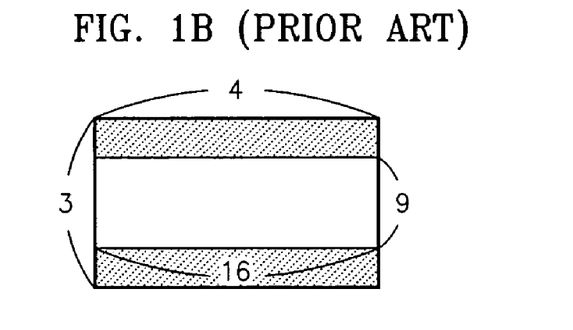
Figure 1C:
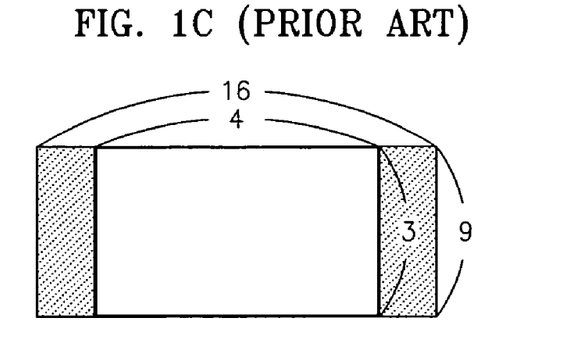
Figure 1D:
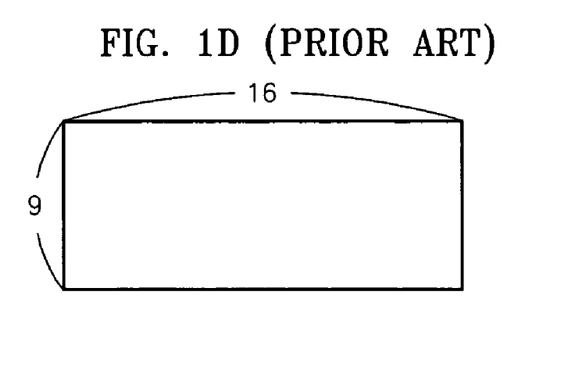

FIGS. 1A, 1B, 1C, and 1D show types of pictures displayed on a display device during a playback from a conventional DVD. In particular, FIG. 1A shows a picture having an aspect ratio of 4:3. FIG. 1B shows a 4:3 letter box picture with blanks marked with slanted lines appearing in upper and lower portions thereof, where a 16:9 source picture is displayed on a 4:3 screen of the display device. FIG. 1C shows a 4:3 pan-scan picture to overcome the disadvantage of a size reduction of actual contents in the 4:3 letter box picture. In other words, relatively unimportant side portions of the 16:9 source picture are cut out to display the remaining source picture as a 4:3 picture. That is, only a portion of the source picture is shown to a user as the 4:3 letter box picture, while the cut portions are not shown to the user. The quality of the 4:3 pan-scan picture is dependent on how portions to be cut are determined, i.e., the user's skill. FIG. 1D shows a 16:9 picture.

In the conventional art, an interactive picture is fixedly displayed as one of the pictures of FIGS. 1A, 1B, 1C, and 1D. In this case, where a markup document recorded on an interactive DVD is displayed on a display device having a screen with an aspect ratio that is not fit for the markup document, a portion of data in a markup picture, such as texts, graphics, or the like, may be distorted.

Figure 2A:
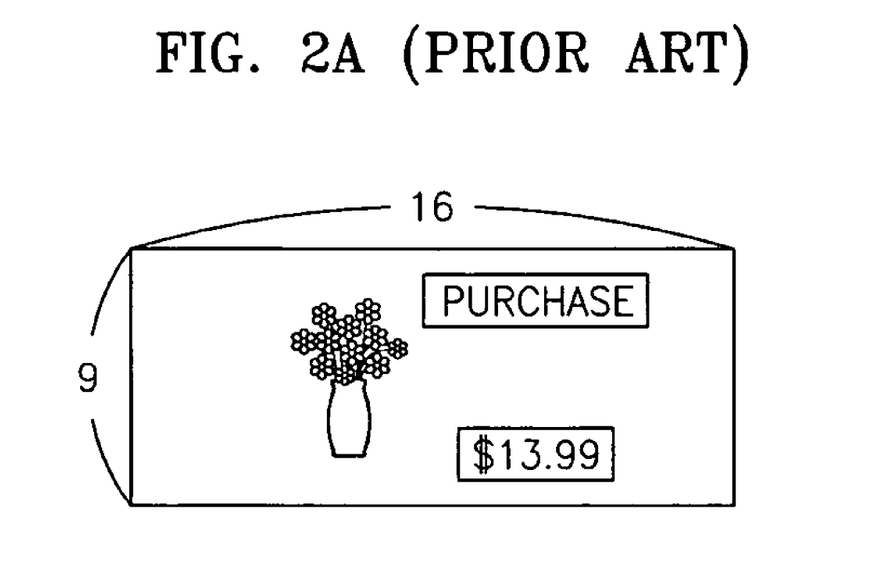
FIG. 2A is a view showing a markup document made as a 16:9 source picture.
Figure 2B:
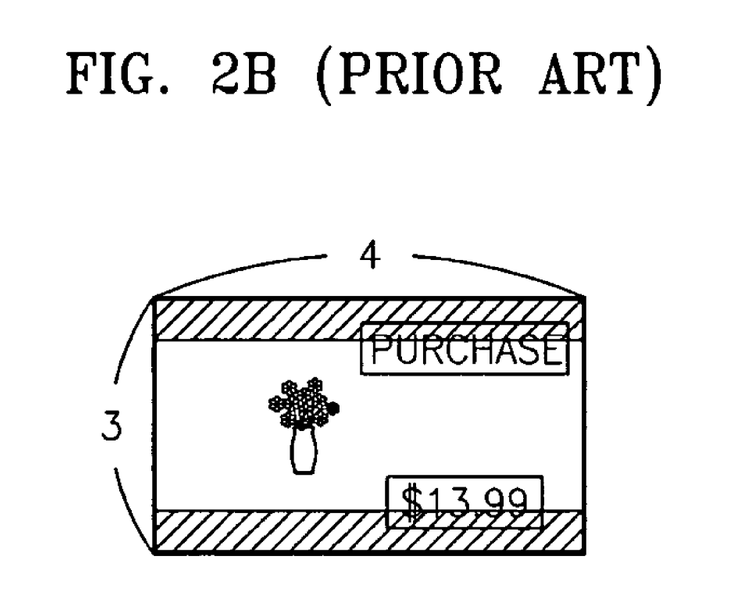
FIG. 2B is a view showing a case where the markup document of FIG. 2A is distortedly displayed as a 4:3 letter box picture.

FIGS. 2A and 2B illustrate a case where a markup document made as a 16:9 source picture is distortedly displayed in a 4:3 letter box picture. FIG. 2A illustrates a 16:9 source picture displayed on a 16:9 screen, and FIG. 2B illustrate a case where the 16:9 source picture is displayed as the 4:3 letter box picture. As shown in FIG. 2B, the size of an AV picture is reduced, whereas a markup picture containing texts, graphics or the like written in a HTML is displayed as is. Accordingly, a portion of the texts, graphics or the like may overlap blank portions of the 4:3 letter box picture and may not be shown to a user.

SUMMARY OF THE INVENTION

Accordingly, it is an aspect of the present invention to provide an information storage medium including device-aspect-ratio information of a markup document, and a method and apparatus to display an interactive picture using the device-aspect-ratio information.

Additional aspects and/or advantages of the present invention will be set forth in part in the description which follows and, in part, will be obvious from the description, or may be learned by practice of the invention.

To achieve the above and/or other aspects of the present invention, there is provided an information storage medium comprising video data and a markup document to play back the video data in an interactive mode, wherein the markup document includes device-aspect-ratio information which is referred to display the markup document.

The device-aspect-ratio information may be information on an aspect ratio of a target display device intended to display the markup document in the interactive mode. The device-aspect-ratio information may be provided according to a design of a markup document maker.

The device-aspect-ratio information may be instruction information to transform a source markup picture into a markup picture with a predetermined aspect ratio, the source markup picture being obtained from the markup document.

To achieve the above and/or other aspects of the present invention, there is provided a method of displaying an interactive picture using a markup document and audio video (AV) data, the method comprising obtaining device-aspect-ratio information corresponding to the markup document, obtaining a markup picture from the markup document according to the device-aspect-ratio information, obtaining an AV picture from the AV data, and displaying the interactive picture including combining the AV picture and the markup picture.

The device-aspect-ratio information may be included in the markup document.

The obtaining of the device-aspect-ratio information may comprise reading information on an aspect ratio of a target display device intended to display the markup document in an interactive mode.

The obtaining of the device-aspect-ratio information may comprise parsing device-aspect-ratio information which is written in the markup document using a property of a tag.

The obtaining of the markup picture may comprise transforming a source markup picture into the markup picture with a predetermined aspect ratio according to the device-aspect-ratio information, the source markup picture being obtained from the markup document.

The obtaining of the markup picture may comprise scaling a source markup picture to output the markup picture corresponding to the device-aspect-ratio information in response to information on an aspect ratio of a destination device being different from the device-aspect-ratio information, the destination device substantially displaying the markup document.

To achieve the above and/or other aspects of the present invention, there is provided a method of processing a markup document in an interactive mode, the method comprising determining whether device-aspect-ratio information is included in the markup document, the device-aspect-ratio information being data including information on an aspect ratio of a target display device intended to display the markup document in the interactive mode, and processing the markup document according to the device-aspect-ratio information in response to the device-aspect-ratio information being included in the markup document.

The processing of the markup document may comprise transforming a source markup picture obtained from the markup document according to the device-aspect-ratio information in response to information on an aspect ratio of a destination device displaying the markup document being different from the device-aspect-ratio information, and outputting the source markup picture as is in response to the information on the aspect ratio of the destination device corresponding to the device-aspect-ratio information.

To achieve the above and/or other aspects of the present invention, there is provided a method of processing a source markup picture of a markup document and a source audio video (AV) picture of an AV data in an interactive mode, the method comprising obtaining AV picture type selection information, determining whether device-aspect-ratio information is included in the markup document, transforming the source AV picture according to the AV picture type selection information and outputting the source markup picture as is in response to the device-aspect-ratio information not being included in the markup document, and transforming the source AV picture and the source markup picture according to the AV picture type selection information and the device-aspect-ratio information, respectively, in response to the device-aspect-ratio information being included in the markup document.

To achieve the above and/or other aspects of the present invention, there is provided an apparatus which processes audio and video (AV) data in an interactive mode using a markup document, comprising an AV playback engine and an enhanced audio and video (ENAV) engine. The AV playback engine decodes the AV data to output an AV picture. The ENAV engine interprets the markup document to obtain a source markup picture, transforms the source markup picture into a markup picture, combines the markup picture and the AV picture, and outputs an interactive picture including the markup picture and the AV picture.

The ENAV engine may read device-aspect-ratio information included in the markup document and obtain the markup picture according to the device-aspect-ratio information.

The ENAV engine may obtain device-aspect-ratio information which is information on an aspect ratio of a screen of a target display device intended to display the markup document in the interactive mode.

The ENAV engine may parse device-aspect-ratio information which is written in the markup document using a property of a tag.

The ENAV engine may transform the source markup picture into the markup picture with a predetermined aspect ratio according to device-aspect-ratio information of the markup document.

To achieve the above and/or other aspects of the present invention, there is provided an apparatus for processing a markup document in an interactive mode, comprising a controller to output a markup picture of the markup document and a video picture of an audio video data in the interactive mode, and a markup transformer which transforms the markup picture according to device-aspect-ratio information corresponding to the markup document, the device-aspect-ratio information being data including information on an aspect ratio of a target display device intended to display the markup document.

The markup transformer may scale the markup picture according to the device-aspect-ratio information in response to information on an aspect ratio of a destination device displaying the markup document being different from the device-aspect-ratio information and output markup picture as is in response to the information on the aspect ratio of the destination device corresponding to the device-aspect-ratio information.

To achieve the above and/or other aspects of the present invention, there is provided a computer readable medium encoded with operating instructions for implementing a method of displaying an interactive picture using a markup document and audio video (AV) data, performed by a computer, the method comprising obtaining device-aspect-ratio information corresponding to the markup document, obtaining a markup picture from the markup document according to the device-aspect-ratio information, obtaining an AV picture from the AV data, and displaying the interactive picture including combining the AV picture and the markup picture.

To achieve the above and/or other aspects of the present invention, there is provided a computer readable medium encoded with operating instructions for implementing a method of processing a markup document in an interactive mode, performed by a computer, the method comprising determining whether device-aspect-ratio information is included in the markup document, the device-aspect-ratio information being data including information on an aspect ratio of a target display device intended to display the markup document in the interactive mode, and processing the markup document according to the device-aspect-ratio information in response to the device-aspect-ratio information being included in the markup document.

To achieve the above and/or other aspects of the present invention, there is provided a method in a computer system to process audio video (AV) data in an interactive mode using a markup document, the method comprising controlling an AV playback engine to obtain a video picture of the AV data, and controlling an enhanced audio and video (ENAV) engine to transform a markup picture of the markup document according to device-aspect-ratio information corresponding to the markup document, the device-aspect-ratio information being data including information on an aspect ratio of a target display device intended to display the markup document in the interactive mode.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE INVENTION

Reference will now be made in detail to the embodiments of the present invention, examples of which are illustrated in the accompanying drawings, wherein like reference numerals refer to like elements throughout. The embodiments are described below in order to explain the present invention by referring to the figures.

A "markup document" is data recorded to support an interactive mode. The markup document refers to, for example, a markup document written in a markup language and/or script codes, script code files and program files linked to the markup document or additionally provided, and resource files such as audio files, animation files, image files, or the like linked to and displayed with the markup document. In other words, the markup document serves as an application program necessary to play back AV data in an interactive mode and as additional contents provided with the AV data.

Figure 3:
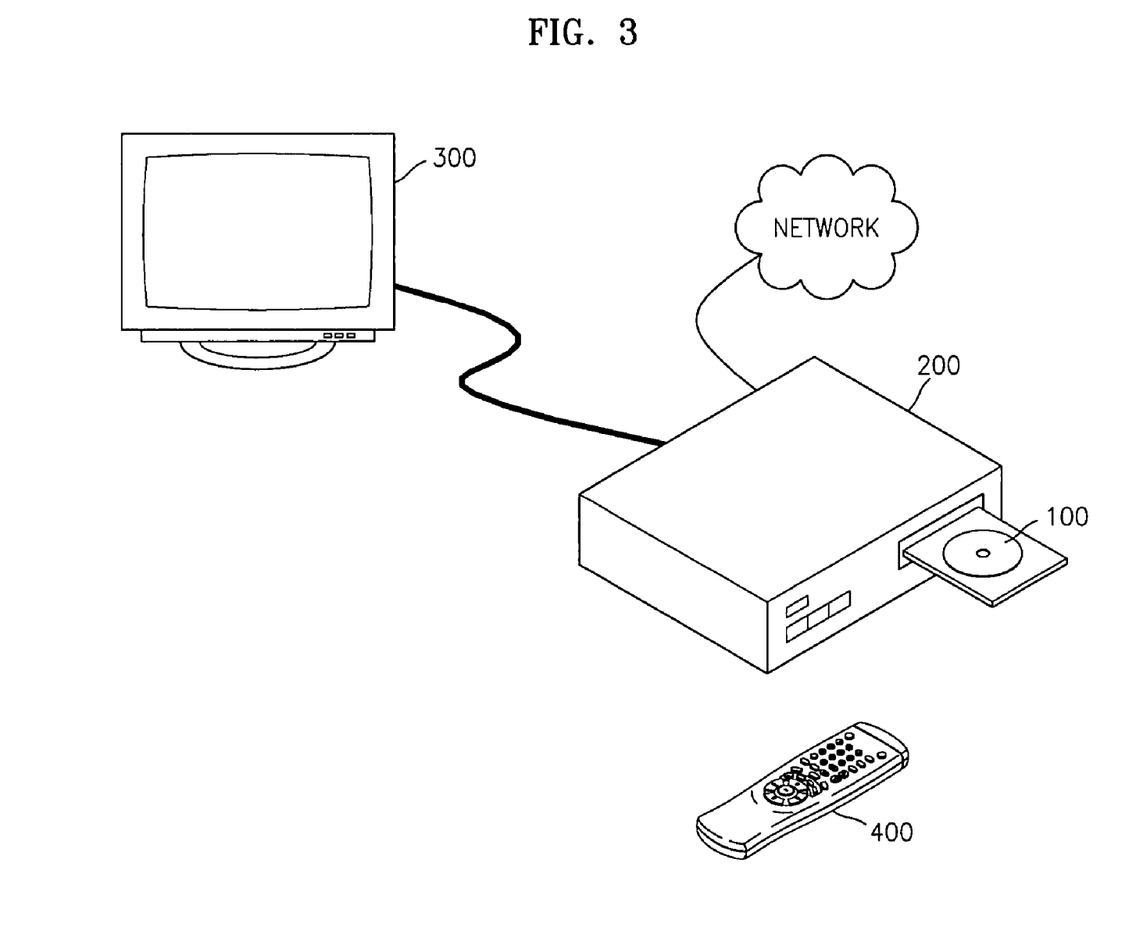
FIG. 3 is a view of a playback system according to an embodiment of the present invention.

FIG. 3 shows a playback system according to an embodiment of the present invention. The playback system includes a playback device 200, a display device, for example, a television (TV) monitor 300, and a remote controller 400. The remote controller 400 may serve as a user input device. An information storage medium, for example, a disc 100, supports an interactive mode. According to an embodiment of the present invention, the information storage medium comprises a markup document including device-aspect-ratio information. The device-aspect-ratio information is used to display the markup document.

The remote controller 400 receives a control command from a user and transmits the control command to the playback device 200. The playback device 200 plays back AV data recorded on the disc 100 in an interactive mode. That is, where the disc 100 is loaded into a DVD drive and the user selects the interactive mode, the playback device 200 plays back the AV data from the disc 100 and transmits the AV data to the TV monitor 300. The TV monitor 300 displays an AV picture obtained from the AV data, along with a markup picture obtained from a markup document. An "interactive picture" refers to a combination of the AV picture and the markup picture.

An "interactive mode" refers to a mode in which an AV picture is displayed in a display window defined by a markup document. In other words, the interactive mode refers to a mode in which an AV picture is embedded in a markup picture to be displayed as an interactive picture. Here, the AV picture refers to DVD-Video data which is recorded on the disc 100, played back by the playback device 200, and displayed on the TV monitor 300. The markup picture refers to a markup document which is recorded on the disc 100, interpreted and executed by the playback device 200, and displayed on the TV monitor 300. A "video mode" refers to a mode in which AV data is played back according to DVD-Video standards. In other words, the video mode refers to a mode in which only an AV picture obtained from playback of AV data is displayed. According to an embodiment of the present invention, the playback device 200 supports both the interactive mode and the video mode, and may obtain AV data and/or interactive data via a network, for example, the Internet.

The playback device 200 outputs the markup picture as is or transforms the markup picture according to device-aspect-ratio information of the markup document. For example, the device-aspect-ratio information refers to information on an aspect ratio of a display device intended to display the markup document in an interactive mode. A picture prior to being transformed is referred to as a source markup picture and/or a source AV picture, and a transformed or non-transformed picture being finally shown to the user may be referred to as a markup picture and/or an AV picture. According to an aspect of the present invention, the playback device 200 checks an aspect ratio of a destination device, i.e., an actual aspect ratio of the TV monitor 300, and even though the actual aspect ratio of the TV monitor 300 is different from the device-aspect-ratio information in the markup document, the playback device 200 scales and outputs the markup picture so as to fit/correspond to the device-aspect-ratio information.

According to an embodiment of the present invention, where a source markup picture is intended to be displayed in a display device having an aspect ratio of 16:9, according to, for example, a design of a markup document content maker, the markup document includes device-aspect-ratio information corresponding to 16:9. In this case, where an actual display device has an actual aspect ratio of 16:9, the markup document is displayed as is. Where the actual display device has an actual aspect ratio of, for example, 4:3, the source markup picture is transformed according to the device-aspect-ratio information corresponding to 16:9 to be fitted into the actual display of 4:3.

The user may set display information in the playback device 200 via the remote controller 400 or an on-screen-display (OSD) menu. The display information includes AV picture type selection information to select a type of an AV picture to be shown to the user in the video mode or the interactive mode. In the present embodiment, displayable types of pictures include a 4:3 picture, a 16:9 picture, a 4:3 letter box picture, and a 4:3 pan-scan picture.

Figure 4:
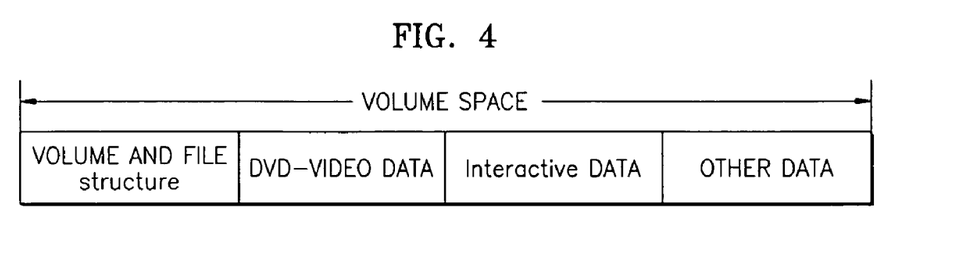
FIG. 4 is a block diagram illustrating a volume space of a disc 100 of FIG. 3.

FIG. 4 shows a volume space of the disc 100 of FIG. 3, according to an embodiment of the present invention. The volume space includes a volume and file structure area, a DVD-Video data area, an interactive data area, and an other-data area. Information on volume and file is recorded in the volume and file structure area, and AV data, for example, video titles, recorded in a DVD-Video format is included in the DVD-Video data area. The interactive data area includes markup document files to support the interactive mode.

The DVD-Video data area may further include control information VIDEO_TS.IFO to control a playback of a total set of video titles recorded on the disc 100, control information VTS_01_0.IFO to control a playback of a first set of video titles, and AV data VTS_01_0.VOB, VTS_01_1.VOB, . . . , and VTS_01_n.VOB. The AV data VTS_01_0.VOB, VTS_01_1.VOB, . . . , and VTS_01_n.VOB refer to the video titles, i.e., video objects VOB. Each of the vide objects VOB includes a video object unit VOBU in which a navigation pack, a video pack, and an audio pack are packed. The detailed structure of the video objects VOB is described in a DVD-Video standard (DVD-Video for Read Only Memory Disc 1.0).

The interactive data area stores a plurality of markup document files. In other words, the interactive data area stores a startup file which is read first in response to the interactive mode being selected, a markup document corresponding to a selected video title, and the like.

As described above, according to an aspect of the present invention, interactive data is written in a plurality of markup document files. As previously described, the markup document files refer to markup documents, script code files, program files, style sheets to define styles of the markup documents, and resource files such as audio files, animation files, image files, and so forth to be linked to and displayed with the markup documents.

Figure 5:
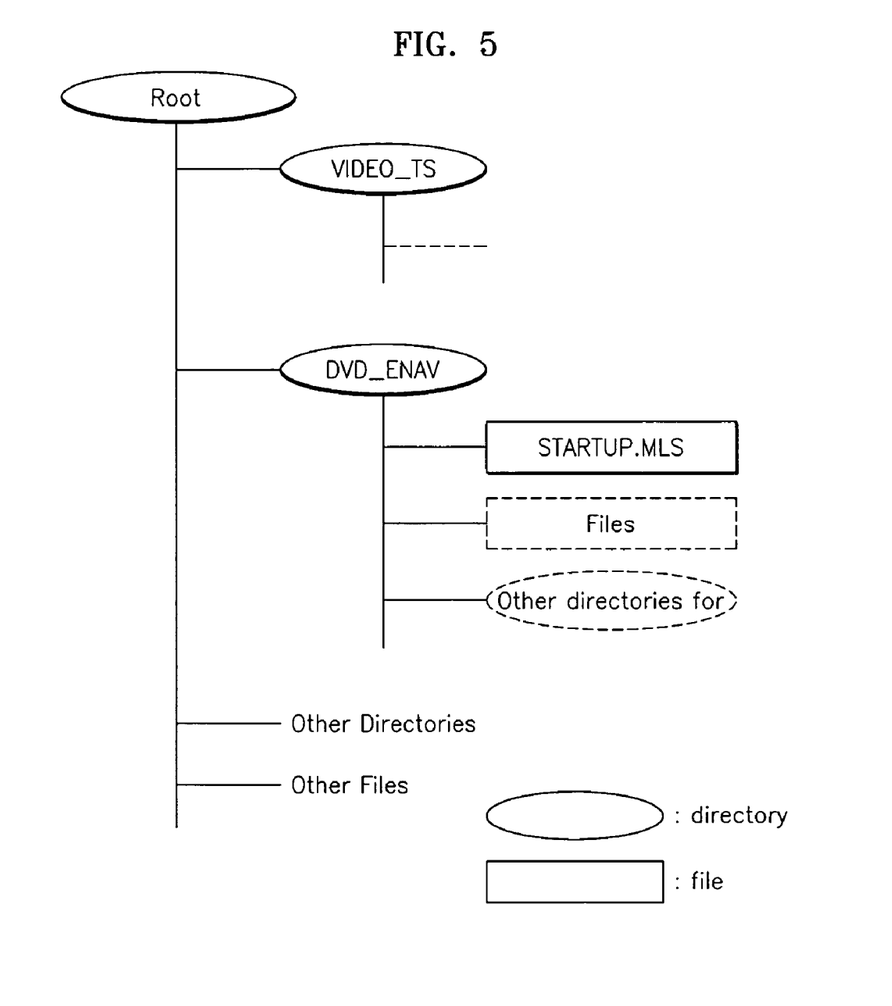
FIG. 5 is a root chart illustrating a directory structure of the disc 100, according to an embodiment of the present invention.

FIG. 5 shows a directory structure of the disc 100, according to an embodiment of the present invention. Referring to FIG. 5, a root directory includes a DVD-Video directory VIDEO_TS, and an ENAV directory DVD-ENAV in which interactive data is recorded to support the interactive mode. While not explained in detail, the root directory may further include other directories and other files.

The DVD-Video directory VIDEO_TS stores the control information (VIDEO_TS.IFO and VTS_01_0.IFO), the AV data (VTS_01_0.VOB, VTS_01_1.VOB, . . . , and VTS_01_n.VOB), and the like. The ENAV directory DVD_ENAV stores a startup file (STARTUP.MLS), other ENAV files, and the like.

Figure 6:
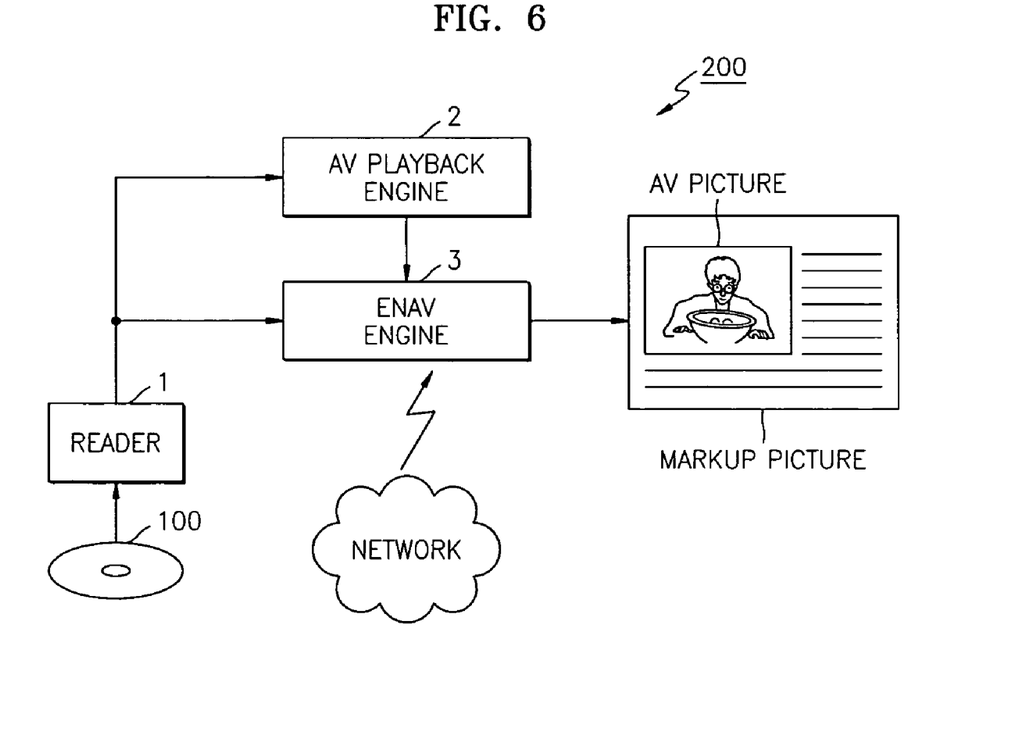
FIG. 6 is a block diagram of a playback device 200 of FIG. 3.

FIG. 6 shows the playback device 200 of FIG. 3 according to an embodiment of the present invention. The playback device 200 includes a reader 1, an AV playback engine 2, and an ENAV engine 3. The reader 1 reads the AV data, i.e., the DVD-Video data and the markup documents, from the disc 100 according to a control signal output from the ENAV engine 3.

The AV playback engine 2 plays back the read AV data. According to an embodiment of the present embodiment, where the AV data is recorded as the DVD-Video data, the AV playback engine 2 can be realized as a DVD-Video playback engine which plays back the DVD-Video data. In particular, the AV playback engine 2 transforms an AV picture with reference to the AV picture type selection information set in the playback device 200.

The ENAV engine 3 interprets and executes the markup documents to play back the DVD-Video data recorded on the disc 100 in the interactive mode. The ENAV engine 3 also blends and outputs the DVD-Video data stream from the AV playback engine 2 and the interpreted markup documents. The TV monitor 300 then displays a markup picture in which the AV picture is embedded. While not shown, the ENAV engine 3 may include various plug-ins that assist to open files of various formats included in or linked to the markup documents. For example, the ENAV engine 3 can call a Windows Media Player to play back AV data which can be displayed only in the Windows Media Player. The ENAV engine 3 can also be connected to a network to fetch necessary information such as ENAV files or the like.

In particular, the ENAV engine 3 reads the device-aspect-ratio information in the markup document, and transforms a source markup picture or outputs the source markup picture as is, with reference to the device-aspect-ratio information. The ENAV engine 3 checks the actual aspect ratio of the TV monitor 300, i.e., destination-aspect-ratio information, and where the device-aspect-ratio information is different from the destination-aspect-ratio information, the ENAV engine 3 scales and outputs the markup picture so as to correspond to the device-aspect-ratio information.

The AV playback engine 2 communicates with the ENAV engine 3 via an Application Program Interface (API). For example, the AV playback engine 2 responds to a request of the ENAV engine 3, informs the ENAV engine 3 of its status, and sends a "trigger" to the ENAV engine 3. For example, where a war scene of the movie Star Wars is displayed in an AV picture in an interactive mode, the ENAV engine 3 is informed by the trigger before and after the displaying of the war scene that a quiz corresponding to the war scene should be displayed in the interactive picture.

Figure 7:
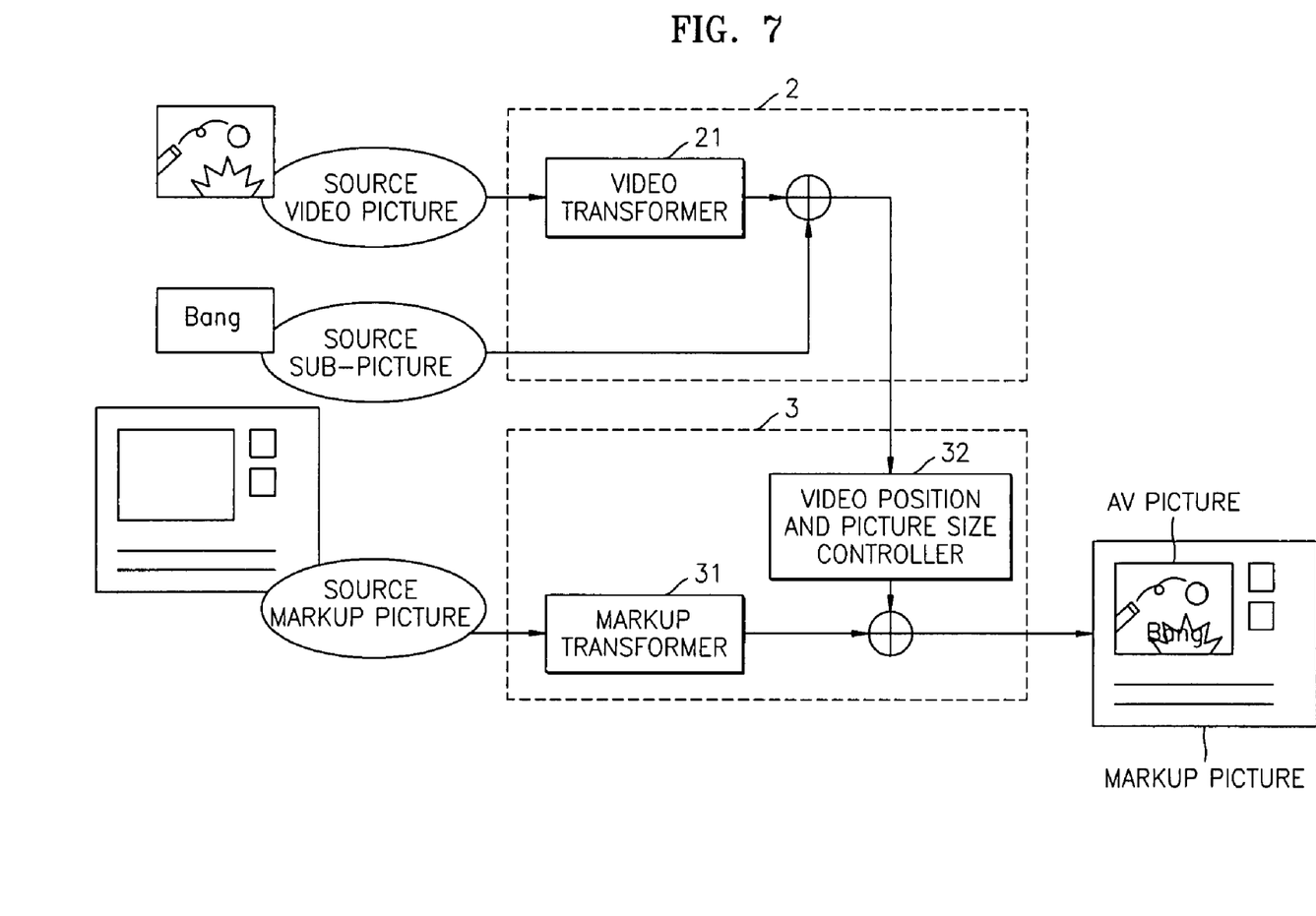
FIG. 7 is a detailed block diagram of an AV playback engine 2 and an enhanced AV (ENAV) engine 3 of FIG. 6.

FIG. 7 shows the AV playback engine 2 and the ENAV engine 3 of FIG. 6 according to an embodiment of the present invention. The AV playback engine 2 includes a video transformer 21, and the ENAV engine 3 includes a markup transformer 31 and a video position and picture size controller 32.

The name of a source video picture derives from a feature in that only video data, except audio data, is perceived via the visual organ of the user. The user can substantially view the source video picture as an AV picture. A source sub-picture is obtained from sub-picture data. The sub-picture data is defined according to DVD-Video standards. A source markup picture is obtained from the markup document.

The video transformer 21 transforms the source video picture into a video picture according to the AV picture type selection information set by the user. Where the source video picture fits/corresponds to the AV picture type selection information, the video transformer 21 may output the source video picture as is. Here, the source video picture is obtained by decoding the AV data. The source sub-picture is added to the video picture.

The markup transformer 31 transforms the source markup picture into a markup picture according to the device-aspect-ratio information of the markup document. Where the device-aspect ration information corresponds to the destination-aspect-ratio information, the video transformer 31 may output the source markup picture as is. Where the device-aspect-ratio information is different from the destination-aspect-ratio information, the markup transformer 31 scales the source markup picture and outputs the markup picture based on the device-aspect-ratio information.

The video position and picture size controller 32 combines the markup picture and the video picture to output the interactive picture. In particular, the video position and picture size controller 32 adjusts the position and size of the AV picture with reference to instruction information to embed the AV picture in the markup picture. For example, the instruction information is recorded in the markup document and provides instructions as to the position and size of a video to be displayed.

Figure 8:
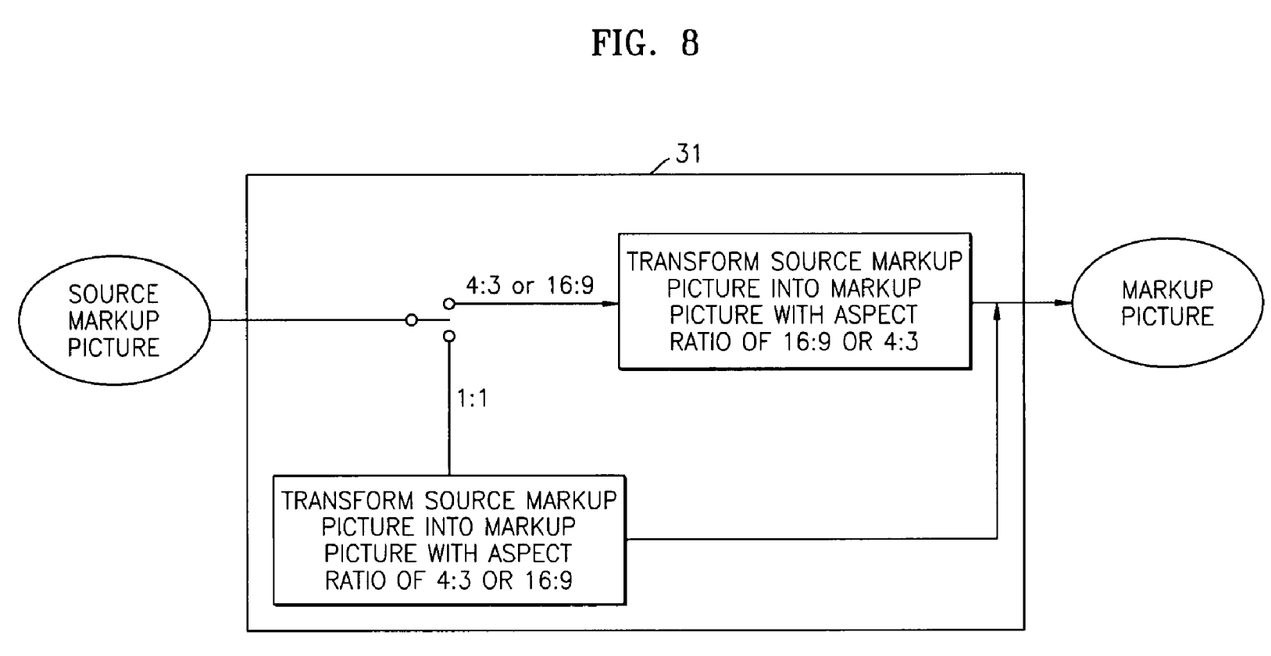
FIG. 8 is a block diagram illustrating an operation of a markup transformer 31 of FIG. 7.

FIG. 8 shows an operation of the markup transformer 31 of FIG. 7 according to an embodiment of the present invention. Referring to FIG. 8, where the source markup picture has an aspect ratio of 1:1, the markup transformer 31 transforms the source markup picture into a markup picture with an aspect ratio of 4:3 or 16:9 with reference to the device-aspect-ratio information in the markup document. Where the source markup picture has an aspect ratio of 4:3 or 16:9, the markup transformer 31 transforms the source markup picture into a markup picture with an aspect ratio 16:9 or 4:3 with reference to the device-aspect-ratio information.

Where the device-aspect-ratio information is different from the destination-aspect-ratio information, the markup transformer 31 scales the source markup picture and outputs a markup picture fit for the device-aspect-ratio information.

According to an embodiment of the present invention, the markup transformer 31 may operate as follows. Where a markup document includes device-aspect ratio information for a 4:3 ratio, and a destination display device, for example, the TV monitor 300, is a 4:3 TV monitor, a source markup picture is output as is. Where the destination display device is not a 4:3 TV monitor, instead for example, is a 16:9 TV monitor, the source markup picture is scaled, so output of it may have a 4:3 aspect ratio on the TV monitor.

According to another embodiment of the present invention, where a markup document includes device-aspect-ratio information for a 16:9 ratio, and a destination display device, for example, the TV monitor 300, is a 16:9 TV monitor, a source markup picture is output as is. Where, the destination display device is not a 16:9 TV monitor, instead for example, is a 4:3 TV monitor, the source markup picture may be scaled, so output of it may have a 16:9 aspect ratio on the TV monitor, for example, in a letter-boxed output setup.

In the present embodiment, while a display device, for example, the TV monitor 300, is described with respect to an aspect ratio of 4:3 or 16:9 and that the device-aspect-ratio information in the markup document targets on a display device with an aspect ratio of 4:3 or 16:9, it is understood that an aspect ratio may vary. Accordingly, the present invention is not limited with respect to the above-described aspect ratios, and is applicable to other aspect ratios without departing from the spirit and scope of the present invention.

Figure 9:
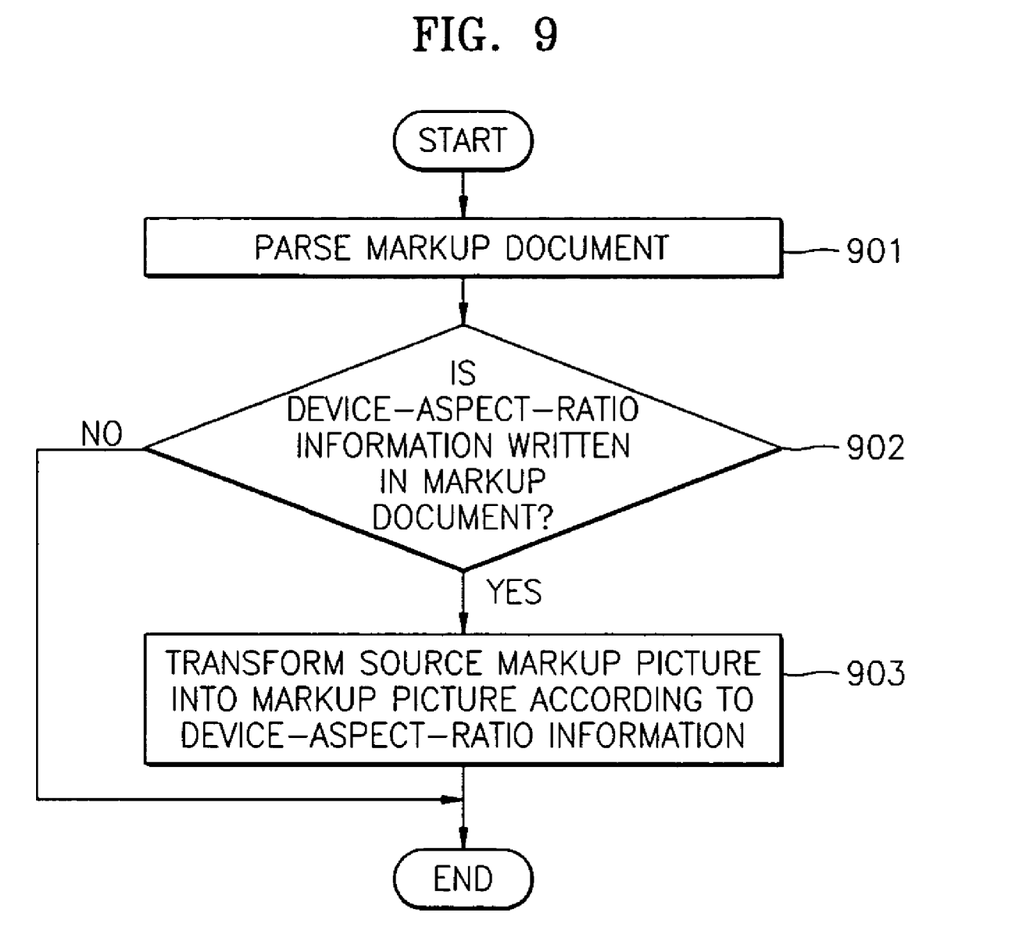
FIG. 9 is a flowchart illustrating a method of transforming a source markup picture according to device-aspect-ratio information, according to an embodiment of the present invention.

FIG. 9 illustrates a method of transforming a source markup picture, according to an embodiment of the present invention. In operation 901, the ENAV engine 3 parses a markup document. In operation 902, the ENAV engine 3 determines whether device-aspect-ratio information is written in the markup document. Where the device-aspect-ratio information is written in the markup document, the ENAV engine 3 transforms a source markup picture into a markup picture with an aspect ratio corresponding to the device-aspect-ratio information in operation 903.

Figure 10:
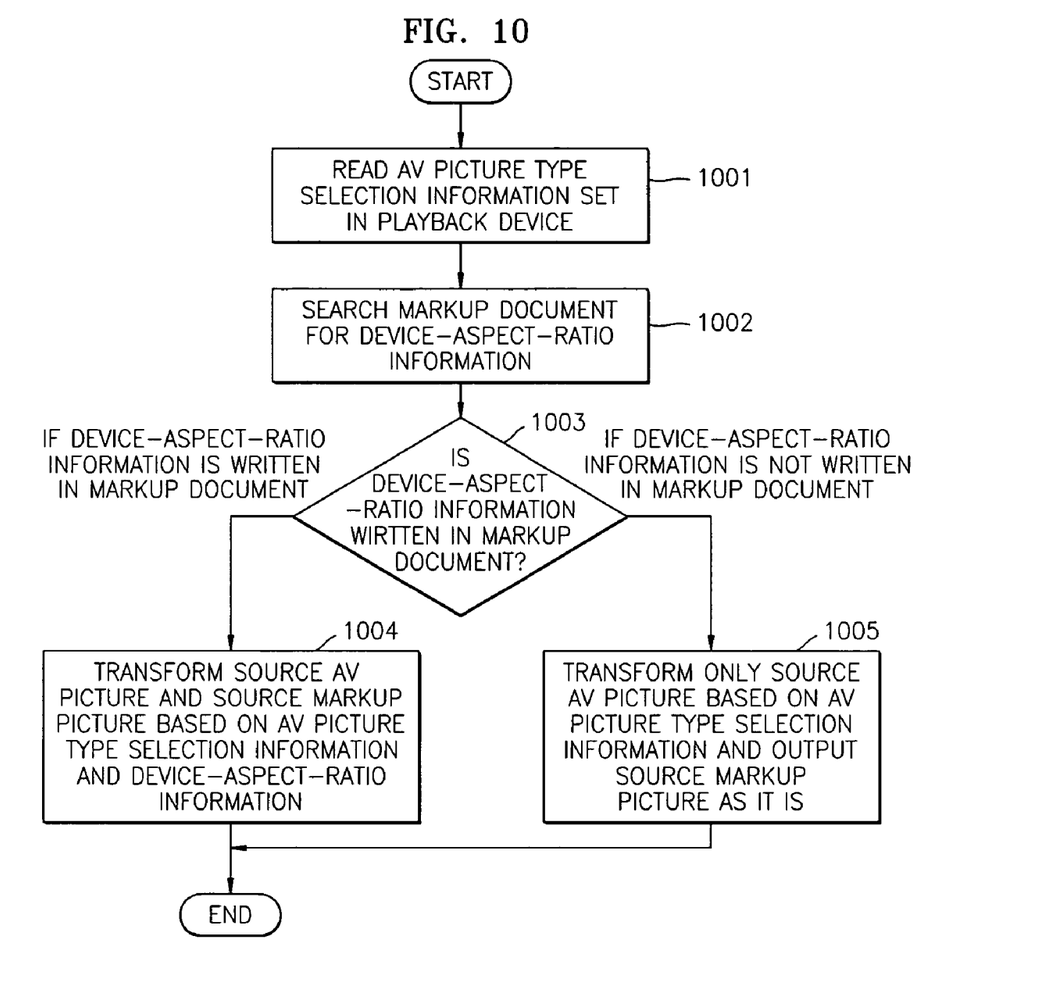
FIG. 10 is a flowchart illustrating a method of transforming a source markup picture and a source video picture, according to an embodiment of the present invention.

FIG. 10 illustrates a method of transforming a source markup picture and a source video picture, according to another embodiment of the present invention. In operation 1001, the playback device 200 reads AV picture type selection information of display information set by, for example, a user. In operation 1002, the playback device 200 searches a markup document for device-aspect-ratio information. In operation 1003, the playback device 200 determines whether the device-aspect-ratio information is written in the markup document. Where the device-aspect-ratio information is written in the markup document, the playback device 200 transforms an source AV picture and a source markup picture based on the AV picture type selection information and the device-aspect-ratio information in operation 1004. Where the device-aspect-ratio information is not written in the markup document, the playback device 200 transforms only the source AV picture based on the AV picture type selection information and outputs the source markup picture as is, in operation 1005

An example of a markup document including device-aspect-ratio information is shown below.

```
<?xml version="1.0" encoding="UTF-8"?>
<!DOCTYPE html PUBLIC -//DVD/DTD XHTML DVD-HTML1.0//EN"
"http://www.dvdforum.org/enav/dvdhtml-1-0.dtd">
<html>
<head>
<title>4x3 PAGE </title>
<meta name="bestlook" content="4:3" />
<script language="ecmascript">
<![CDATA[
function onload_handler ( )
{
idplayer.play( );
idplayer.enableVideoTransform(0);
// if 0, disable video transformation, while if 1, enable video transformation.
}
]]>
</script>
</head>
<body id=" docbody" onload="onload_handler ( )">
<object style=" position: absolute; left: 150px; top: 100px; width: 370px; height: 250px"
data="dvd:video_ts" id="idplayer" />
</body>
</html>
```

As shown in the above example, the device-aspect-ratio information is inserted into the markup document using a tag <meta name="bestlook" content="aspect ratio">. As in the above example, an interactive picture may be displayed according to a design of a content maker by writing information on an aspect ratio of a target display device in a markup document.

Another example of the markup document including the device-aspect-ratio information is shown below.

```
<?xml version="1.0" encoding="UTF-8"?>
<!DOCTYPE html PUBLIC -//DVD/DTD XHTML DVD-HTML1.0//EN"
"http://www.dvdforum.org/enav/dvdhtml-1-0.dtd">
<html>
<head>
<title>4x3 PAGE </title>
<meta name="bestlook" content="R720x480,A4x3" />
<script language="ecmascript">
<![CDATA[
function onload_handler ( )
{
idplayer.play( );
idplayer.enableVideoTransform(0);
// if 0, disable first video transformation, while if 1, enable video transformation.
}
]]>
</script>
</head>
<body id=" docbody" onload="onload_handler ( )">
<object style=" position: absolute; left: 150px; top: 100px; width: 370px; height: 250px"
data="dvd:video_ts" id="idplayer" />
</body>
</html>
```

As shown in the above example, according to an embodiment of the present invention, in addition to the device-aspect-ratio information, resolution information is inserted into the markup document using a tag <meta name="bestlook" content="Rresolution,Aaspect ratio">. In this case, the playback device 200 may display a markup document according to the resolution information provided by the design of the content maker.

As described above, according to the present invention, information on an aspect ratio of a screen of a target display device can be written in a markup document. A source markup picture can be transformed into a markup picture with reference to the information.

According to an aspect of the present invention, an interactive picture including a markup document is displayed in an interactive mode according to a design of a content maker without being distorted in position and size.

While a display device has been described with respect to a TV monitor, and an information storage medium has been described with respect to a DVD, it is understood that the present invention is not limited thereto. For example, other storage media known or to be known may comprise a markup document including device-aspect-ratio information, within the scope of the present invention. Furthermore, while a display system has been described with respect to a playback device, it is understood that the present invention is applicable to, for example, a system having a playback device which reproduces and/or records data with respect to an information storage medium.

It is understood that a system which uses the present invention also includes permanent or removable storage, such as magnetic and optical discs, RAM, ROM, etc., on which the process and data structures of the present invention can be stored and distributed. The operations can also be distributed via, for example, downloading over a network such as the Internet. Aspects of the present invention may also be realized as a data signal embodied in a carrier wave and comprising a program readable by a computer and transmittable over the Internet.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of displaying an interactive picture using a markup document and audio and/or video (AV) data, the method comprising:
    obtaining device-aspect-ratio information corresponding to the markup document;
    obtaining a markup picture from the markup document according to the device-aspect-ratio information;
    obtaining an AV picture from the AV data; and
    displaying the interactive picture including combining the AV picture and the markup picture,
    wherein the obtaining of the device-aspect-ratio information comprises parsing the device-aspect-ratio information which is written in the markup document using a property of a tag.

2. A method of displaying an interactive picture using a markup document and audio and/or video (AV) data, the method comprising:
    obtaining device-aspect-ratio information corresponding to the markup document;
    obtaining a markup picture from the markup document according to the device-aspect-ratio information;
    obtaining an AV picture from the AV data; and
    displaying the interactive picture including combining the AV picture and the markup picture,
    wherein the device-aspect-ratio information is included in the markup document.

3. A method of displaying an interactive picture using a markup document and audio and/or video (AV) data, the method comprising:
    obtaining device-aspect-ratio information corresponding to the markup document;
    obtaining a markup picture from the markup document according to the device-aspect-ratio information;
    obtaining an AV picture from the AV data; and
    displaying the interactive picture including combining the AV picture and the markup picture,
    wherein the obtaining of the device-aspect-ratio information comprises reading information on an aspect ratio of a target display device intended to display the markup document and information on a resolution of the markup document, the information on the aspect ratio and the information on the resolution being written in the markup document using a property of a tag.

4. An apparatus which processes audio and/or video (AV) data in an interactive mode using a markup document, the apparatus comprising:
   a reader configured to read the AV data from a disc;
   an AV playback engine configured to decode the AV data provided from the reader to output an AV picture; and
   an enhanced audio and/or video (ENAV) engine configured to:
      interpret the markup document to read device-aspect-ratio information included in the markup document and to obtain a source markup picture, transforms the source markup picture into a markup picture according to the device-aspect-ratio information, combines the markup picture and the AV picture, and outputs an interactive picture including the markup picture and the AV picture; and
      parse the device-aspect-ratio information which is written in the markup document using a property of a tag.

5. An apparatus which processes audio and/or video (AV) data in an interactive mode using a markup document, comprising:
   a reader configured to read the AV data from a disc;
   an AV playback engine configured to decode the AV data provided from the reader to output an AV picture; and
   an enhanced audio and/or video (ENAV) engine configured to:
      interpret the markup document to read device-aspect-ratio information included in the markup document and to obtain a source markup picture, transforms the source markup picture into a markup picture according to the device-aspect-ratio information, combines the markup picture and the AV picture, and outputs an interactive picture including the markup picture and the AV picture; and
      transform the source markup picture into the markup picture with a predetermined aspect ratio according to the device-aspect-ratio information of the markup document.

6. An apparatus which processes audio and/or video (AV) data in an interactive mode using a markup document, the apparatus comprising:
   a reader configured to read the AV data from a disc;
   an AV playback engine configured to decode the AV data provided from the reader to output an AV picture; and
   an enhanced audio and/or video (ENAV) engine configured to:
      interpret the markup document to read device-aspect-ratio information included in the markup document and to obtain a source markup picture, transforms the source markup picture into a markup picture according to the device-aspect-ratio information, combines the markup picture and the AV picture, and outputs an interactive picture including the markup picture and the AV picture; and
      transform the source markup picture into the markup picture with an aspect ratio of 4:3 or 16:9 according to the device-aspect-ratio information of the markup document.

7. An apparatus which processes audio and/or video (AV) data in an interactive mode using a markup document, the apparatus comprising:
   a reader configured to read the AV data from a disc;
   an AV playback engine configured to decode the AV data provided from the reader to output an AV picture; and
   an enhanced audio and/or video (ENAV) engine configured to:
      interpret the markup document to read device-aspect-ratio information included in the markup document and to obtain a source markup picture, transforms the source markup picture into a markup picture according to the device-aspect-ratio information, combines the markup picture and the AV picture, and outputs an interactive picture including the markup picture and the AV picture; and
      scale the source markup picture to output the markup picture corresponding to the device-aspect-ratio information of the markup document in response to information on an aspect ratio of a destination device being different from the device-aspect-ratio information, the destination device substantially displaying the markup document and the device-aspect-ratio information being data including information on an aspect ratio of a target display device intended to display the markup document in the interactive mode.

* * * * *